(12) United States Patent
Demming et al.

(10) Patent No.: US 11,724,382 B2
(45) Date of Patent: Aug. 15, 2023

(54) WORKPIECE STORAGE DEVICE AND WORKPIECE HANDLING SYSTEM HAVING A WORKPIECE STORAGE DEVICE

(71) Applicant: Flender GmbH, Bocholt (DE)

(72) Inventors: Martin Demming, Bocholt (DE); Norbert Liemann, Bocholt (DE)

(73) Assignee: FLENDER GMBH, Bocholt (DE)

( * ) Notice: Subject to any disclaimer, the term of this patent is extended or adjusted under 35 U.S.C. 154(b) by 633 days.

(21) Appl. No.: 16/815,236

(22) Filed: Mar. 11, 2020

(65) Prior Publication Data
US 2020/0290165 A1    Sep. 17, 2020

(30) Foreign Application Priority Data

Mar. 14, 2019   (EP) .................................... 19162824

(51) Int. Cl.
*B25J 9/00*     (2006.01)
*B25H 3/04*     (2006.01)

(52) U.S. Cl.
CPC . *B25J 9/00* (2013.01); *B25H 3/04* (2013.01)

(58) Field of Classification Search
CPC ...... B25H 3/04; B25H 1/0064; B25H 1/0007; B25J 9/00; B25B 11/00; B25B 1/02; B25B 1/2463; B23Q 3/00; B23Q 3/005
(Continued)

(56) References Cited

U.S. PATENT DOCUMENTS 8,286,953 B2 * 10/2012 Barnes ...................... F42B 6/06
269/57
8,764,000 B2 *  7/2014 Fisk ...................... F01D 25/285
269/902
(Continued)

FOREIGN PATENT DOCUMENTS

CN   108656066 A  * 10/2018
EP      0098573 A1    1/1984
(Continued)

OTHER PUBLICATIONS

Indian Office Action for related Indian Patent Application No. 202034007866 dated Jan. 19, 2021.
(Continued)

*Primary Examiner* — Lee D Wilson
*Assistant Examiner* — Tyler James McFarland
(74) *Attorney, Agent, or Firm* — Lempia Summerfield Katz LLC

(57) ABSTRACT

The disclosure relates to a workpiece handling systems and workpiece storage devices for elongate workpieces of shaft-like form which are at least substantially rotationally symmetrical relative to their longitudinal axis and which have along their longitudinal axis at least one projection extending in the peripheral direction, which projection protrudes radially outwards relative to a workpiece region arranged immediately axially adjacent thereto. The workpiece storage device includes a base plate and a plurality of workpiece holders. The workpiece holders are fastened to the base plate and protrude upwards therefrom, and which define workpiece receiving surfaces. In each case, at least two workpiece holders are associated with a workpiece to be received, wherein the workpiece holders associated with a workpiece to be received are so configured, spaced apart from one another and oriented relative to one another that the longitudinal axis of a workpiece placed thereon from above slopes relative to the horizontal in such a manner that the workpiece moves under the force of gravity, following the slope, until its projection comes into contact with one of the workpiece holders.

10 Claims, 4 Drawing Sheets

(58) Field of Classification Search
USPC .................................................. 269/38, 281.1
See application file for complete search history.

(56) References Cited

U.S. PATENT DOCUMENTS

| | | | |
|---|---|---|---|
| 9,289,062 B1 | 3/2016 | Posa | |
| 2005/0194330 A1* | 9/2005 | Ziske | B25H 3/04 |
| | | | 211/59.1 |
| 2015/0190922 A1* | 7/2015 | Neal | A47F 5/0823 |
| | | | 211/70.6 |

FOREIGN PATENT DOCUMENTS

| | | | | |
|---|---|---|---|---|
| EP | 0267533 | A2 | 5/1988 | |
| EP | 1905538 | A1 | 4/2008 | |
| EP | 2314414 | A1 * | 4/2011 | ............... B23Q 7/10 |
| EP | 2314414 | A1 | 4/2011 | |
| JP | 2000126973 | A | 9/2000 | |

OTHER PUBLICATIONS

European Search Report for European Application No. 19162824. 7-1016 dated Aug. 9, 2019.
European Office Action for European Application No. 19162824.7 dated Feb. 1, 2023.

* cited by examiner

WORKPIECE STORAGE DEVICE AND WORKPIECE HANDLING SYSTEM HAVING A WORKPIECE STORAGE DEVICE

The present patent document claims the benefit of European Patent Application No. 19162824.7, filed Mar. 14, 2019, which is hereby incorporated by reference.

TECHNICAL FIELD

The present disclosure relates to a workpiece storage device for elongate workpieces of shaft-like form which are at least substantially rotationally symmetrical relative to their longitudinal axis and which have along their longitudinal axis at least one projection extending in the peripheral direction, which projection protrudes radially outwards relative to a workpiece region arranged immediately axially adjacent thereto, including a base plate and a plurality of workpiece holders which are fastened to the base plate and protrude upwards therefrom and which define workpiece receiving surfaces, wherein in each case at least two workpiece holders are associated with a workpiece to be received. The present disclosure relates further to a workpiece handling system having such a workpiece storage device and a robotic arm for handling the workpieces received on the workpiece storage device.

BACKGROUND

Workpieces in shaft-like form, (for example, in the form of bevel gear shafts or the like), may be stored horizontally in workpiece storage devices. In order to be able to convey the workpieces to and remove them from the workpiece storage devices automatically using a multi-axle robotic arm, the workpiece storage device provides storage positions for the workpieces which are precisely defined both radially and axially. If these positions are not accurate, it may result in the incorrect placement or incorrect removal of the workpieces, whereby the automated manufacturing process may be disrupted. The radial positioning of the components is frequently achieved via workpiece holders of prism-like form. The axial orientation of the workpieces takes place in each case via a defined stop defined on one of the workpiece holders associated with a workpiece, which stop cooperates with the at least one projection of the workpiece extending in the peripheral direction. In the case of manual loading of the workpiece storage device, axial positioning of the workpieces placed on the associated workpiece holders may take place by moving the workpiece manually in the direction of its longitudinal axis until the projection of the workpiece comes into contact with the stop formed on one of the workpiece holders. However, this manual axial orientation requires a high degree of meticulousness on the part of the person performing the orientation, which cannot always be provided. Alternatively, it is also possible to provide the workpiece storage device with motor-driven sliders which automatically move the workpieces placed on the workpiece holders into the desired position. Such sliders are very cost-intensive, however, so that they are suitable only for workpiece storage device that are used in large-scale manufacture.

SUMMARY AND DESCRIPTION

Starting from this prior art, it is an object of the present disclosure to provide a workpiece storage device of the type mentioned at the beginning having an alternative construction, in which both the radial and the axial positioning of the workpieces arranged on the workpiece storage device takes place reliably and inexpensively.

The scope of the present disclosure is defined solely by the appended claims and is not affected to any degree by the statements within this summary. The present embodiments may obviate one or more of the drawbacks or limitations in the related art.

In order to achieve this object, the present disclosure provides a workpiece storage device, wherein workpiece holders associated with a workpiece to be received are so configured, spaced apart from one another and oriented relative to one another that the longitudinal axis of a workpiece placed thereon from above slopes relative to the horizontal in such a manner that the workpiece moves under the force of gravity, following the slope, until its projection comes into contact with one of the workpiece holders. Owing to this form of the workpiece holders, the orientation of the workpieces received on the workpiece storage device takes place automatically using the own weight of the workpieces, so that additional positioning devices or mechanisms such as sliders or the like may be omitted. Accordingly, the workpiece storage device is distinguished by its simple and above all inexpensive construction, so that the workpiece storage device is also suitable for small-scale manufacture.

Advantageously, the slope lies in a range from 5 to 45°, whereby proper axial self-orientation of the workpieces received on the workpiece holders is provided. The slope may lie in a range from 10 to 30°, which may simplify manual loading of the workpiece storage device with workpieces.

At least one region, protruding from the base plate, of the workpiece holders may be produced from sheet metal, (e.g., from a sheet metal having a thickness between 4 and 12 mm). Accordingly, the workpiece holders may be manufactured simply and inexpensively.

According to an embodiment, the workpiece holders are provided on their upper side with an opening which is open to the top and which in particular has mutually opposite side walls which are oriented in a V-shape relative to one another. With such openings, simple radial orientation of the workpieces may be carried out. In addition, workpieces with very different diameters may also be received by the same workpiece holders, which makes the workpiece storage device flexible in use.

The side walls of the openings, which in the simplest case themselves define the workpiece contact surfaces, may be provided with a coating which has a lower sliding friction than the material from which the side walls are produced. In this case, the coating then forms the workpiece receiving surfaces. Owing to such a coating, which may be produced, (for example, from plastics material), the reliability of the axial positioning of the workpieces is improved further. In addition, such coatings may also prevent a workpiece from being damaged when the workpiece is placed on the workpiece holders.

According to an embodiment, the workpiece holders include a first portion extending perpendicularly upwards starting from the base plate and, for producing the slope, at least a second portion which adjoins the first portion and is at an angle relative thereto.

The workpiece holders may be fastened to the base plate in a regular matrix, which facilitates the programing of a robotic arm of a workpiece handling system.

In order to achieve the object mentioned above, the present disclosure further provides a workpiece handling system having at least one workpiece storage device, which may be fixed in a defined position, and a robotic arm for handling the workpieces received on the workpiece storage device.

BRIEF DESCRIPTION OF THE DRAWINGS

Further features and advantages of the present disclosure will become apparent from the following description of a workpiece storage device according to an embodiment and of a workpiece handling system having such a workpiece storage device, with reference to the drawings, in which.

DETAILED DESCRIPTION

Figure 1:
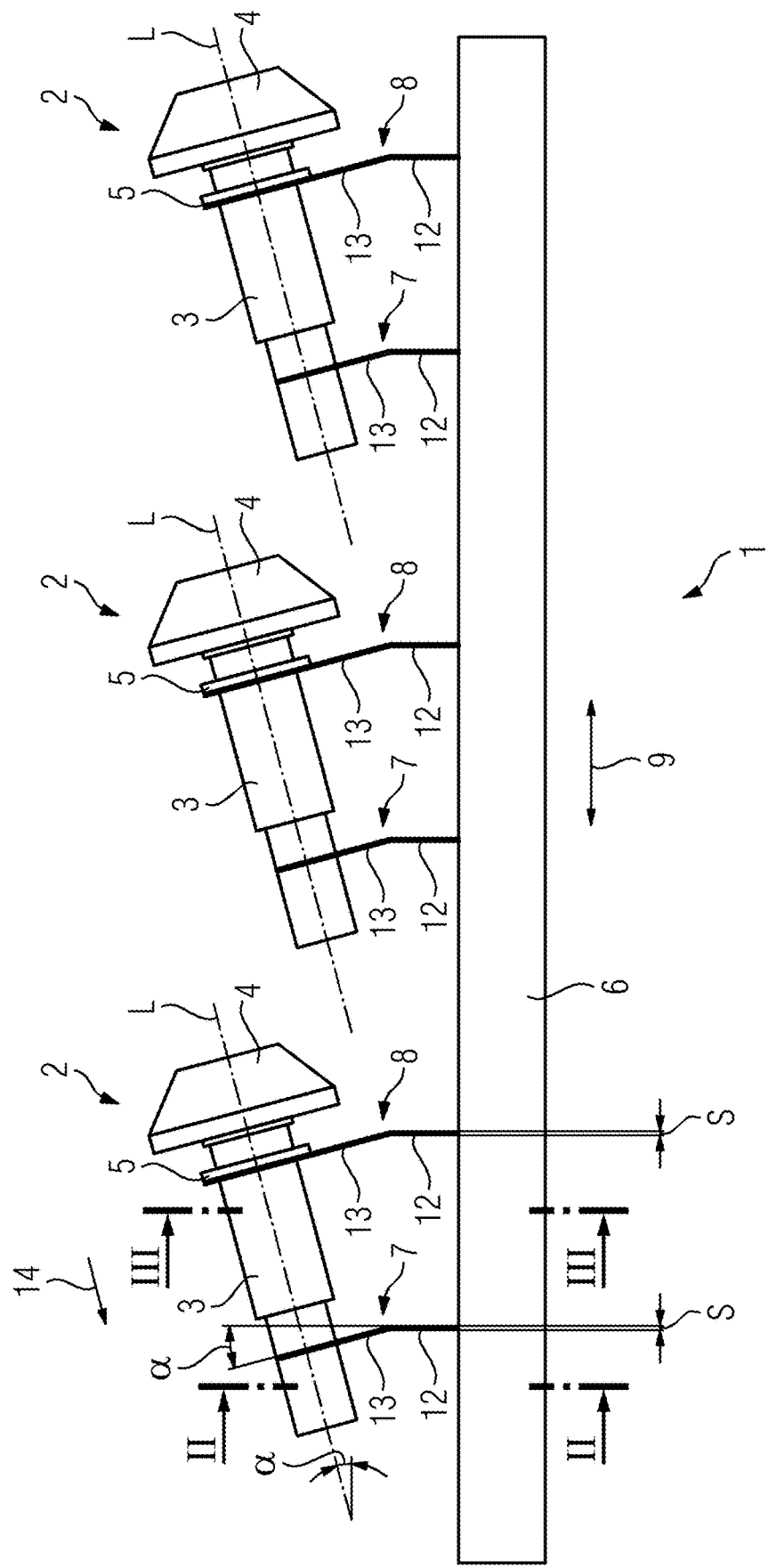
FIG. 1 depicts a side view of a workpiece storage device according to an embodiment in which workpieces have been received.
Figure 2:
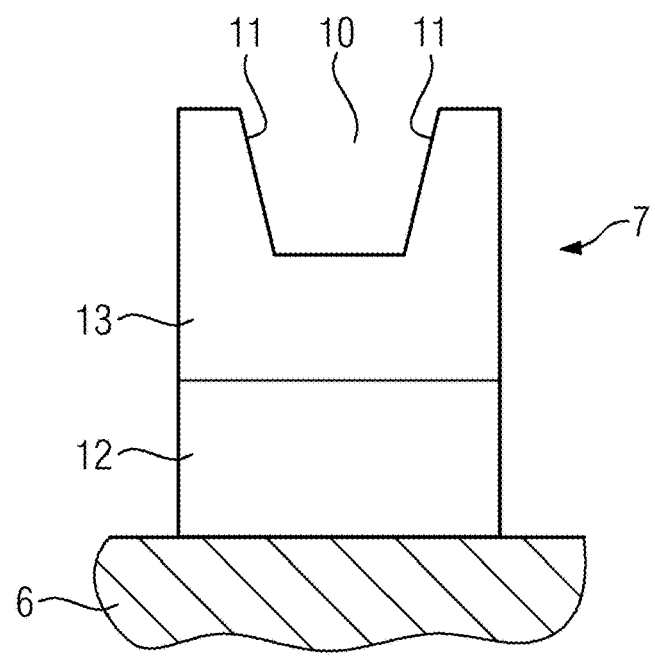
FIG. 2 depicts a sectional view along the line II-II in FIG. 1, wherein, for the sake of simplicity, only a single front workpiece holder without a workpiece received therein is shown.
Figure 3:
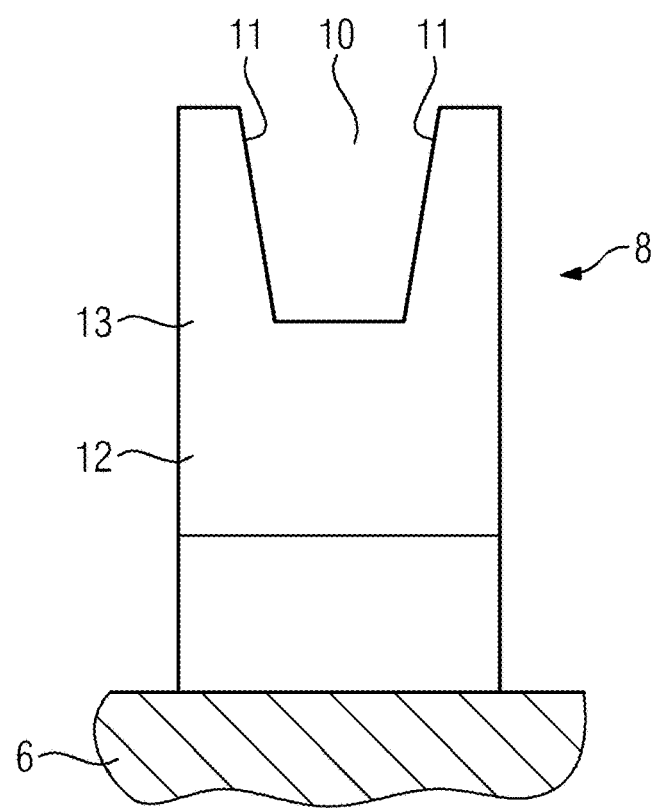
FIG. 3 depicts a sectional view along the line III-III in FIG. 1, which shows a further single rear workpiece holder without a workpiece received therein.

FIGS. 1 to 4 depict a workpiece storage device 1 according to an embodiment. The workpiece storage device 1 serves to receive workpieces 2 of shaft-like form which are at least substantially rotationally symmetrical relative to their longitudinal axis L. The workpieces 2 in the present case are bevel gear shafts in one-piece form having a shaft portion 3 and a bevel gear portion 4. The shaft portion 3 includes regions of different diameters. Furthermore, a projection 5 extending in the peripheral direction is formed on the shaft portion 3, which projection protrudes radially outwards relative to the regions of the shaft portion 3 that are arranged immediately axially adjacent thereto.

The workpiece storage device includes a base plate 6. The base plate 6 may be produced from metal. Fastened to the base plate 6 is a plurality of workpiece holders 7, 8 which protrude upwards from the base plate 6, wherein in each case a workpiece holder 7 and a workpiece holder 8 are associated with a workpiece 2 to be received. The workpiece holders 7, 8 in the present case are each produced from a metal sheet. The thickness S of the workpiece holders 7, 8 may be in the range from 4 to 12 mm, in order to impart to the workpiece holders 7, 8 sufficient stability and dimensional strength. The workpiece holders 7, 8 in the present case have been fastened to the base plate 6 by a material-based connection using a welding or soldering method. However, the workpiece holders 7, 8 may likewise also be screwed to the base plate 6. Alternatively, it is further possible to form in the base plate 6 guides extending parallel to one another, into which the workpiece holders 7, 8 may be pushed in the direction indicated by the arrow 9 and may be locked, e.g., at any desired positions. Such guides are an advantage in that the distances between the workpiece holders 7, 8 are variable and accordingly may be configured to workpieces 2 of different lengths. The workpiece holders 7, 8 may also be replaced, if required, by other workpiece holders of a different size and/or shape, in order to allow the workpiece storage device 1 to be configured to different workpieces.

The workpiece holders 7, 8 that receive a workpiece 2 are so configured, spaced apart from one another and oriented relative to one another that the longitudinal axis L of a workpiece 2 placed thereon from above slopes relative to the horizontal in such a manner that the workpiece 2 moves under the force of gravity, following the slope, until the projection 5 of the workpiece 2 comes into contact with the outer side of the workpiece holder 8. In one example, the slope α is about 15°. The slope α may lie in a range from 5 to 45°, e.g., in a range from 10 to 30°. The workpiece holders 7, 8 may have the same construction. Both workpiece holders 7, 8 have a rectangular base and are provided on their upper side with an opening 10, which is open to the top and has mutually opposite side walls 11. The opposite side walls 11 are oriented in a V-shape relative to one another and define the receiving surfaces for the workpiece 2. The size of the openings 10 and the slope of the V-shape of the side walls 11 are matched to the workpiece diameter to be received. The side walls 11 may be provided with a coating which has a lower sliding friction than the material from which the side walls 11 or the workpiece holders 7, 8 are produced, in order thus to reduce the friction between the workpiece holders 7, 8 and the workpiece 2. However, this is not the case in the present case. The workpiece holders 7, 8 each include a first portion 12 extending perpendicularly upwards starting from the base plate 6 and, for producing the slope of the longitudinal axis L of a workpiece 2 placed thereon from above relative to the horizontal, a second portion 13 which adjoins the first portion 12 and is at an angle α relative thereto. Furthermore, the workpiece holder 8 is designed to be slightly longer than the workpiece holder 7, so that the second portions 13 of the two workpiece holders 7, 8 extend substantially perpendicularly to the longitudinal axis L of the workpiece 2.

If a workpiece 2 is placed from above onto workpiece holders 7, 8 arranged adjacent to one another, the workpiece 2 is oriented radially outwards by the V-shaped side walls 11 of the workpiece holders 7 and 8. Furthermore, the workpiece 2, after being placed onto the workpiece holders 7 and 8, moves under the force of gravity in the direction indicated by the arrow 14, until the projection 5 comes into contact with the workpiece holder 8. As soon as this is the case, the workpiece 2 is also positioned axially on the workpiece holders 7, 8. In this manner, each workpiece 2 acquires a defined positioning on the workpiece storage device 1.

Figure 4:
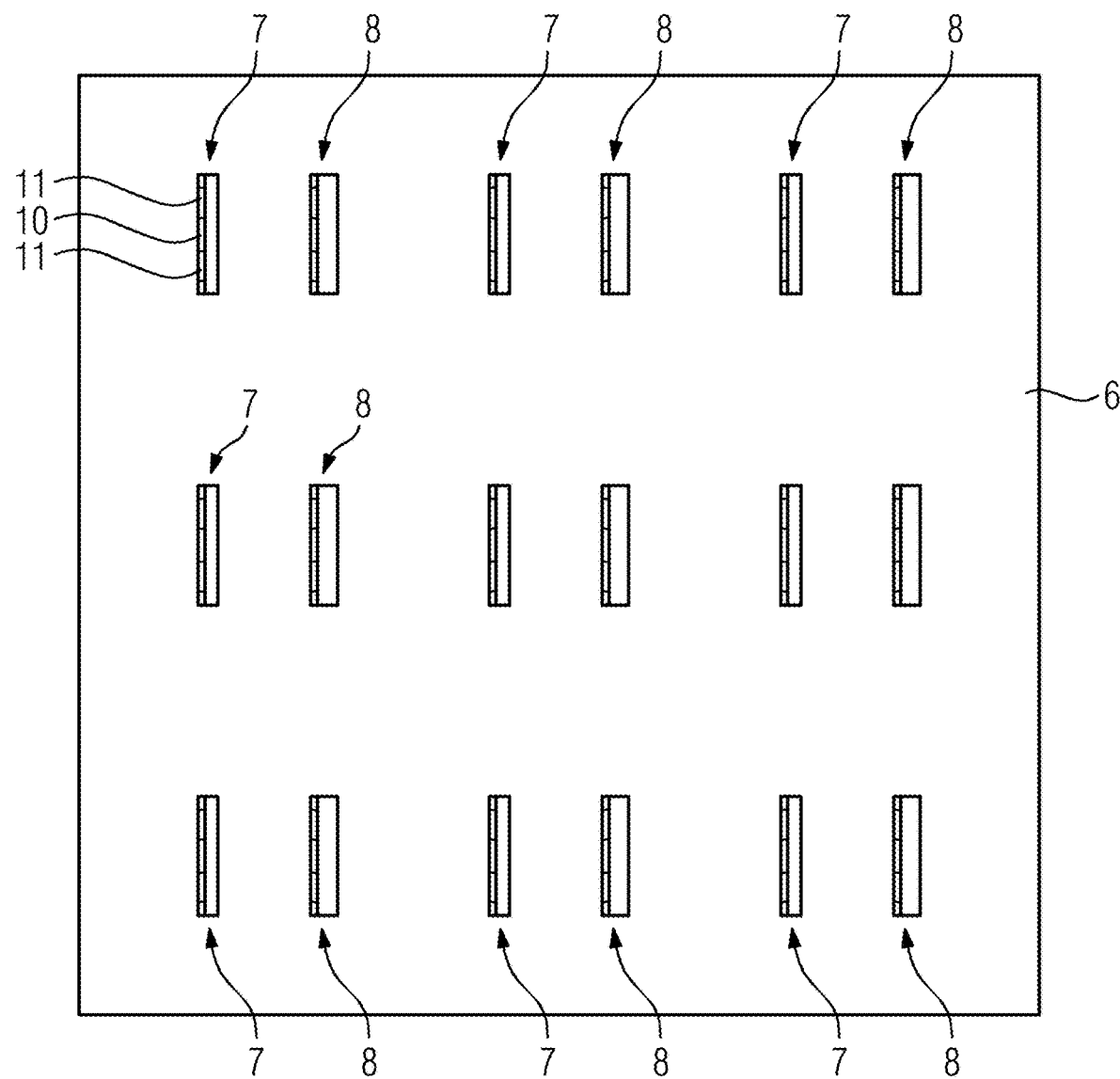
FIG. 4 depicts a plan view of the workpiece storage device shown in FIG. 1 without workpieces received therein.

As is apparent from the plan view according to FIG. 4, the workpiece holders 7, 8 are fastened to the base plate 6 in a regular matrix. It is correspondingly simple to incorporate the positioning of the individual workpieces 2 arranged on the workpiece storage device 1 into a computer program of a workpiece handling system.

Figure 5:
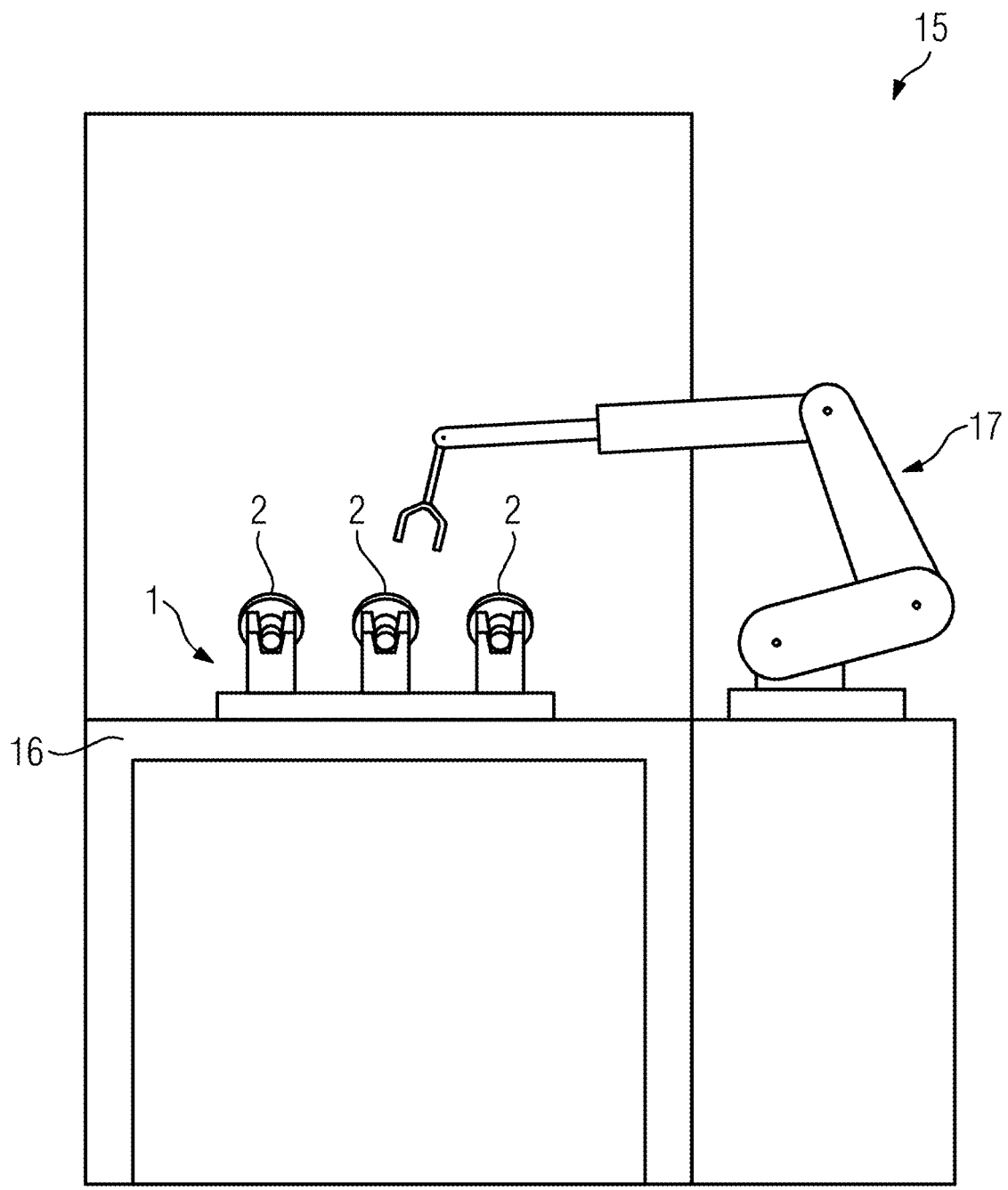
FIG. 5 depicts a schematic front view of a workpiece handling system having the workpiece storage device shown in FIG. 1.

An example of a workpiece handling system 15 is shown in FIG. 5. The workpiece handling system 15 includes a bench 16 on which the above-described workpiece storage device 1 may be fixed in a defined position. The positioning of the workpiece storage device 1 on the bench 16 may take place, for example, using corresponding stops or the like. Fixing of the workpiece storage device 1 may be effected by clamping. The workpiece handling system 15 includes a robotic arm which is configured to handle the workpieces 2 received on the workpiece storage device 1.

Although the disclosure has been illustrated and described in greater detail by the exemplary embodiments, the disclosure is not restricted by these exemplary embodiments.

Other variations may be derived herefrom by the person skilled in the art, without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A workpiece storage device for elongate workpieces of shaft-like form, wherein the elongate workpieces are at least rotationally symmetrical relative to longitudinal axes of the elongate workpieces and which have along each longitudinal axis of each workpiece at least one projection extending in a peripheral direction, wherein the at least one projection protrudes radially outwards relative to a workpiece region arranged immediately axially adjacent thereto, the workpiece storage device comprising:
   a base plate; and
   a plurality of workpiece holders which are fastened to the base plate and protrude upwards from the base plate and which define workpiece receiving surfaces,
   wherein, in each case, at least two workpiece holders of the plurality of workpiece holders are associated with each workpiece of the elongate workpieces to be received, and
   wherein the respective at least two workpiece holders are spaced apart from one another and oriented relative to one another such that the longitudinal axis of the respective workpiece placed thereon from above slopes relative to a horizontal in such a manner that the respective workpiece moves under a force of gravity, following a slope that lies a range from 5° to 45°, until a projection of the respective workpiece comes into contact with one workpiece holder of the at least two workpiece holders,
   wherein each workpiece holder of the plurality of workpiece holders comprises a first portion extending perpendicularly upwards starting from the base plate and, for providing the slope, a second portion which adjoins the first portion and is at an angle relative thereto,
   wherein one workpiece holder of the at least two workpiece holders is configured to be longer than the other workpiece holder of the at least two workpiece holders, and
   wherein the second portion of each workpiece holder of the at least two workpiece holders extends perpendicularly to the longitudinal axis of the workpiece.

2. The workpiece storage device of claim 1, wherein the slope lies in a range from 10 to 30°.

3. The workpiece storage device of claim 1, wherein at least one region of the plurality of workpiece holders, protruding from the base plate of the plurality of workpiece holders comprises a sheet metal.

4. The workpiece storage device of claim 3, wherein the sheet metal has a thickness in a range from 4 to 12 mm.

5. The workpiece storage device of claim 1, wherein each workpiece holder of the plurality of workpiece holders comprises an opening on an upper side of the respective workplace holder, and
   wherein the opening is open on a top end of the respective workplace holder opposite from the base plate.

6. The workpiece storage device of claim 5, wherein each opening further comprises mutually opposite side walls which are oriented in a V-shape relative to one another, and
   wherein the V-shape is defined by the side walls having a larger opening at the top end of the opening than at an opposite, bottom end of the opening adjacent to the base plate.

7. The workpiece storage device of claim 6, wherein the side walls have a coating to provide the workpiece receiving surfaces, and
   wherein the coating has a lower sliding friction than a material of the side walls.

8. The workpiece storage device of claim 1, wherein the plurality of workpiece holders is fastened to the base plate in a regular matrix.

9. A workpiece handling system comprising:
   at least one workpiece storage device having:
      a base plate; and
      a plurality of workpiece holders which are fastened to the base plate and protrude upwards from the base plate and which define workpiece receiving surfaces,
      wherein, in each case, at least two workpiece holders of the plurality of workpiece holders are associated with a workpiece to be received, and
      wherein the respective at least two workpiece holders are spaced apart from one another and oriented relative to one another such that a longitudinal axis of a respective workpiece placed thereon from above slopes relative to a horizontal in such a manner that the respective workpiece moves under a force of gravity, following a slope that lies in a range from 5° to 45°, until a projection of the respective workpiece comes into contact with one workpiece holder of the at least two workpiece holders,
      wherein each workpiece holder of the plurality of workpiece holders comprises a first portion extending perpendicularly upwards starting from the base plate and, for providing the slope, a second portion which adjoins the first portion and is at an angle relative thereto,
      wherein one workpiece holder of the at least two workpiece holders is configured to be longer than the other workpiece holder of the at least two workpiece holders, and
      wherein the second portion of each workpiece holder of the at least two workpiece holders extends perpendicularly to the longitudinal axis of the workpiece; and
   a robotic arm configured to handle workpieces received on the at least one workpiece storage device.

10. The workpiece handling system of claim 9, wherein the at least one workpiece storage device is fixed in a defined position.

* * * * *